(12) United States Patent
Kim

(10) Patent No.: US 7,789,506 B1
(45) Date of Patent: Sep. 7, 2010

(54) FRAME LOCKING DEVICE FOR EYEGLASSES

(76) Inventor: Jong Kim, 2641 W. Olympic Blvd., Los Angeles, CA (US) 90006

( * ) Notice: Subject to any disclaimer, the term of this patent is extended or adjusted under 35 U.S.C. 154(b) by 6 days.

(21) Appl. No.: 12/350,851

(22) Filed: Jan. 8, 2009

(51) Int. Cl.
*G02C 1/02* (2006.01)
(52) U.S. Cl. ........................ 351/110; 351/124
(58) Field of Classification Search ............. 351/110, 351/116, 111, 140, 153, 103, 106, 41, 158, 351/124
See application file for complete search history.

(56) References Cited

U.S. PATENT DOCUMENTS

| | | | | |
|---|---|---|---|---|
| 5,585,870 A | * | 12/1996 | Masunaga | 351/106 |
| 5,835,183 A | * | 11/1998 | Murai et al. | 351/110 |
| 5,847,800 A | * | 12/1998 | Tachibana | 351/110 |
| 6,540,350 B2 | * | 4/2003 | Fujita | 351/110 |
| 6,641,265 B1 | * | 11/2003 | Hou | 351/110 |

* cited by examiner

*Primary Examiner*—Hung X Dang
(74) *Attorney, Agent, or Firm*—John K. Park; Park Law Firm

(57) ABSTRACT

The invention provides a frame locking device for eyeglasses, comprising a locking groove and two locking bumps. The locking groove is provided on an outer edge of a lens, and extends perpendicularly to a surface of the lens. The two locking bumps are provided on a side portion of a frame, apart from each other so as to lock the lens by fixing the outer edge of the lens. A part of the side portion of the frame disposed between the two locking bumps is fitted into the locking groove. Less than half of the side portion of the frame disposed between the two locking bumps may be fitted into the locking groove of the lens. The side portion of the frame disposed between the two locking bumps may comprise elastic parts so as to be pressed to be inserted into and plucked out of the locking groove.

13 Claims, 4 Drawing Sheets

FRAME LOCKING DEVICE FOR EYEGLASSES

BACKGROUND OF THE INVENTION

The present invention relates to a frame locking device for eyeglasses. More particularly, the present invention relates to a frame locking device for eyeglasses, in which the frame is securely locked to the lens with two-way locking device.

In prior arts, the frame is fixed to the lens with many structures using rivets, pegs, screws, or glue. Sometimes, the final results were not satisfactory, which is recognized as a distorted frame, a dislodged frame, and skewed lens by the user.

Therefore, the needs for a frame locking device have been present for a long time considering the wide and wild usage of eyeglasses.

SUMMARY OF THE INVENTION

The present invention contrives to solve the disadvantages of prior arts.

An object of the invention is to provide a frame locking device.

Another object of the invention is to provide a frame locking device which enables to fix and hold the frame in place against the lens.

Still another object of the invention is to provide a frame locking device which facilitates manufacturing and maintaining with a low cost due to a simple structure.

An aspect of the invention provides a frame locking device for eyeglasses. The frame locking device comprises a locking groove and two locking bumps.

The locking groove is provided on an outer edge of a lens, and extends substantially perpendicularly to a surface of the lens.

The two locking bumps are provided on a side portion of a frame, and they are apart from each other so as to lock the lens by fixing the outer edge of the lens.

At least part of the side portion of the frame disposed between the two locking bumps is fitted into the locking groove of the lens such that the frame is locked in place at the locking groove when pressed.

Less than half of the side portion of the frame disposed between the two locking bumps may be fitted into the locking groove of the lens.

Alternatively, more than half of the side portion of the frame disposed between the two locking bumps may be detachably fitted into the locking groove of the lens.

The side portion of the frame disposed between the two locking bumps may comprise elastic parts so as to be pressed to be inserted into the locking groove and plucked out of the locking groove.

The side portion of the frame may be disposed between the two locking bumps has a circular cross-section.

Alternatively, the side portion of the frame disposed between the two locking bumps may have a polygonal cross-section. The locking groove may comprise a partially polygonal cross-sectional groove corresponding to the side portion of the frame.

The frame may further comprise a fastening end configured to be fixed to a portion of the lens.

The fastening end may be provided through a hole disposed around the outer edge of the lens and fixed. The fastening end may be fixed to the hole with glue.

The frame may comprise a first U-shaped portion between the fastening end and the two locking bumps. The first U-shaped portion of the frame may have a predetermined magnitude of elasticity, so as to press the portion between the two locking bumps into the locking groove and hold the frame in place. The frame may comprise a second U-shaped portion between the two locking bumps and a temple portion.

The frame may be connected to a temple portion at a lower portion of the first U-shaped portion of the frame.

Each of the two locking bumps may comprise an elastic surface. The two locking bumps may be made of polymer.

Another aspect of the invention provides a frame locking device for eyeglasses comprising: a locking groove provided on an outer edge of a lens, wherein the locking groove extends substantially perpendicularly to a surface of the lens; and a locking dimple disposed in a middle portion of the locking groove.

The frame comprises a side portion configured to be fitted into the locking groove and a bump configured to be fitted into the locking dimple, such that the frame is locked in place by the locking groove and the locking dimple when pressed by keeping the frame from moving upward, downward, forward, and backward.

The frame may further comprise a fastening end configured to be fixed to a portion of the lens for the same reason as in the first embodiment. The fastening end may be provided through a hole disposed around the outer edge of the lens and fixed. The fastening end may be fixed to the hole with glue.

The advantages of the present invention are: (1) the frame locking device is fixed to the lens securely, not moving up and down or forward and backward; and (2) the frame locking device has a simple structure so as to facilitate manufacturing and maintaining.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
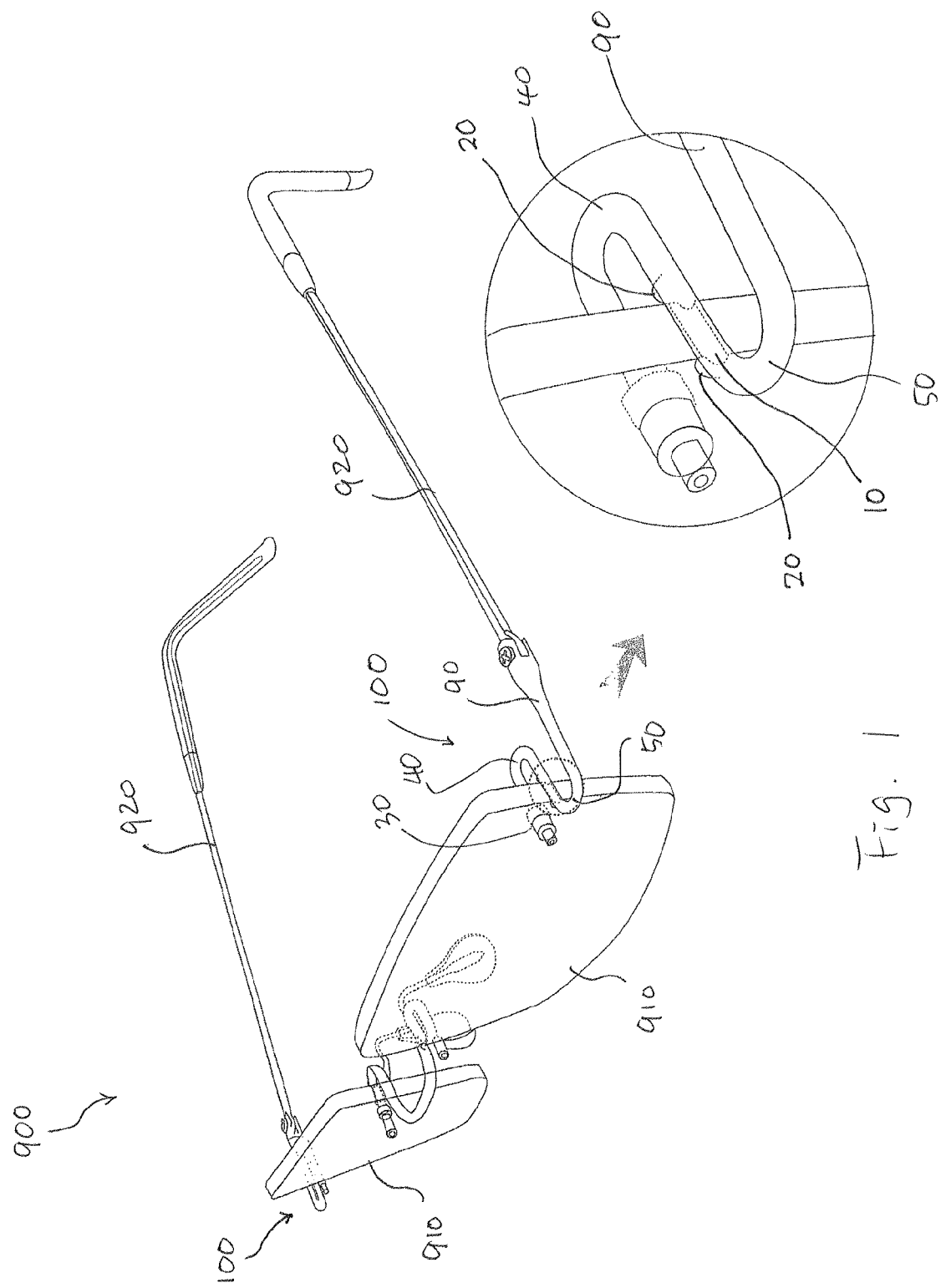
FIG. 1 is a perspective view of a pair of eyeglasses with frames assembled into the eyeglasses according to an embodiment of the present invention.
Figure 2:
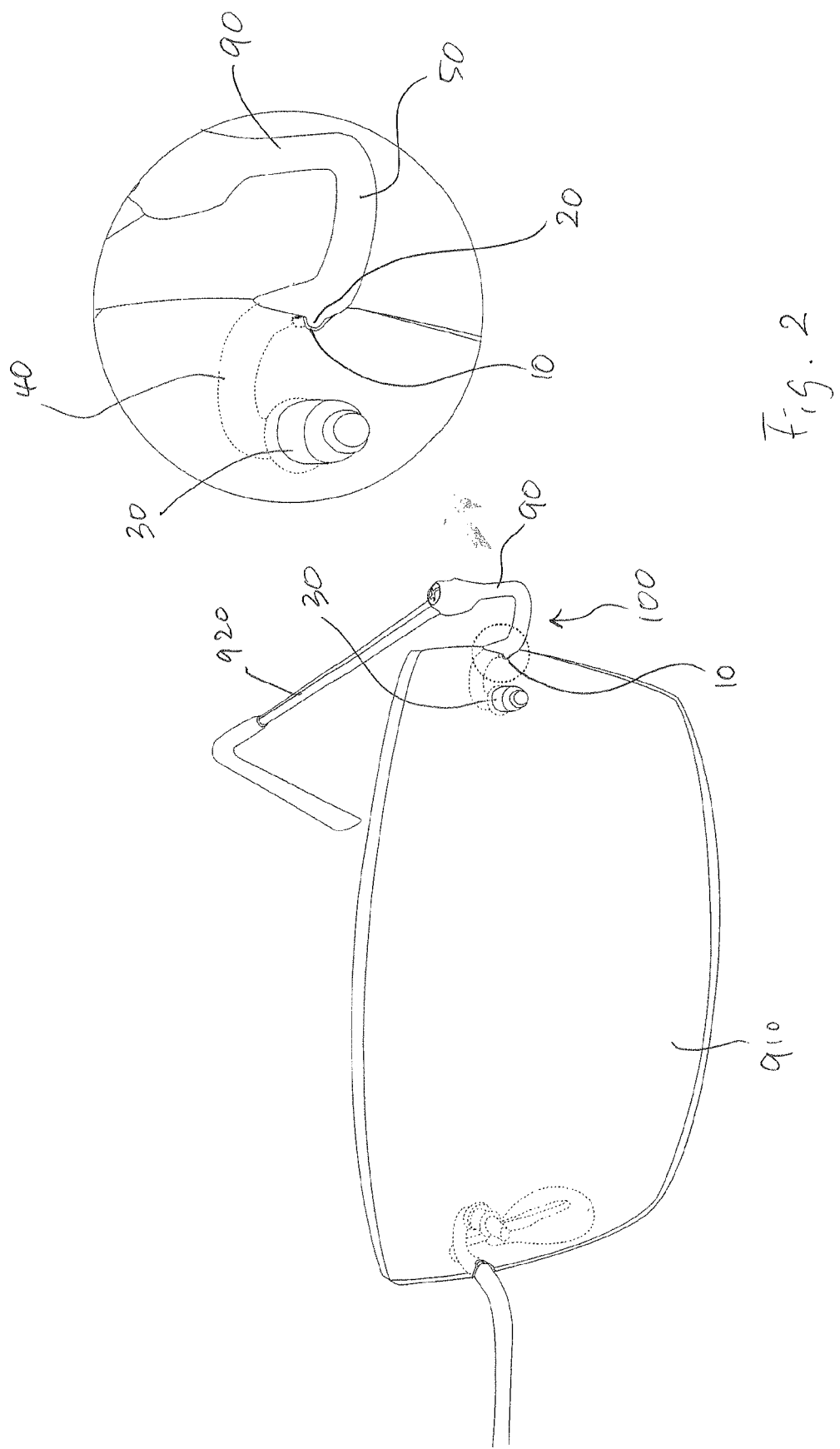
FIG. 2 is a front elevated view of a part of the eyeglasses of FIG. 1.
Figure 3:
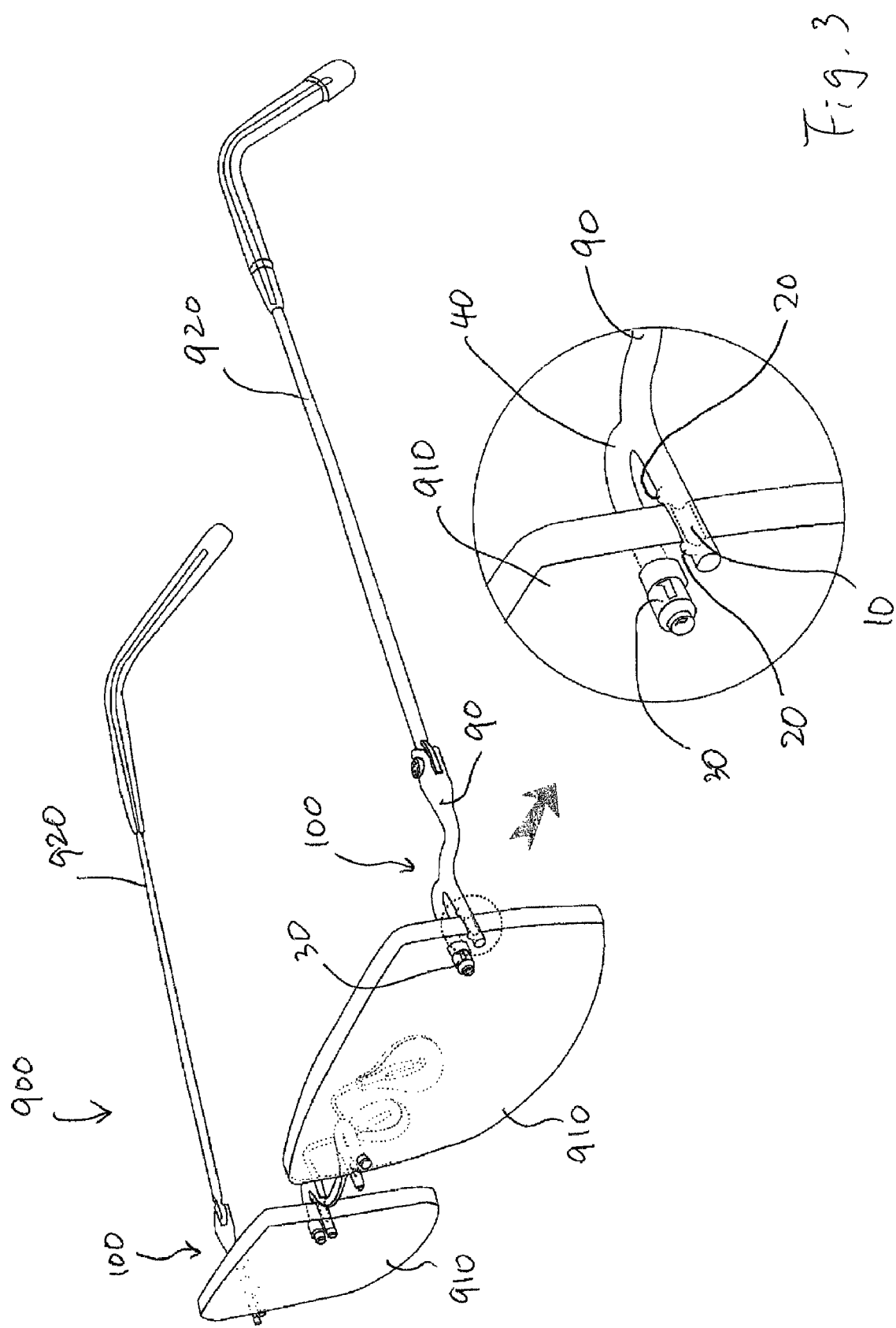
FIG. 3 is a perspective view of a pair of eyeglasses with frames according to another embodiment of the invention.

FIGS. 1 and 2 show an embodiment of the present invention, and FIG. 3 show another embodiment of the present invention.

An aspect of the invention provides a frame locking device 100 for eyeglasses 900. The frame locking device 100 comprises a locking groove 10 and two locking bumps 20.

The locking groove 10 is provided on an outer edge of a lens 910, and extends substantially perpendicularly to a surface of the lens 910. The locking groove 10 limits upward or downward motions of the frame 90.

The two locking bumps 20 are provided on a side portion of a frame 90, and they are apart from each other so as to lock the lens 910 by fixing the outer edge of the lens 910. The two locking bumps 20 limits forward or backward motions of the frame 90 inside the inner portion of the locking groove 10.

At least part of the side portion of the frame 90 disposed between the two locking bumps 20 is fitted into the locking groove 10 of the lens 910 such that the frame 90 is locked in place at the locking groove 10 when pressed.

Less than half of the side portion of the frame 90 disposed between the two locking bumps 20 may be fitted into the locking groove 10 of the lens 910. That is, a part of the lens 910 is latched in the shallow locking groove 10.

Alternatively, more than half of the side portion of the frame 90 disposed between the two locking bumps 20 may be detachably fitted into the locking groove 10 of the lens 910. That is, more than half of the lens 910 is buried in the shallow locking groove 10. In such embodiments of the invention, the side portion of the frame 90 disposed between the two locking bumps 20 should be more elastic so as to be squeezed and pushed into the locking groove 10.

The side portion of the frame 90 disposed between the two locking bumps 20 may comprise elastic parts so as to be pressed to be inserted into the locking groove 10 and plucked out of the locking groove 10.

The side portion of the frame 90 may be disposed between the two locking bumps 20 has a circular cross-section.

Alternatively, the side portion of the frame 90 disposed between the two locking bumps 20 may have a polygonal cross-section. The locking groove 20 may comprise a partially polygonal cross-sectional groove corresponding to the side portion of the frame 90.

The frame 90 may further comprise a fastening end 30 configured to be fixed to a portion of the lens 910. The fastening end 30 may be provided through a hole bored through the lens 910 around the outer edge of the lens 910 and fixed. The fastening end 30 may be fixed to the hole with glue.

The frame 90 may comprise a first U-shaped portion 40 between the fastening end 30 and the two locking bumps 20 as shown in FIGS. 1-3. The first U-shaped portion 40 of the frame 90 may have a predetermined magnitude of elasticity, so as to press the portion between the two locking bumps 20 into the locking groove 10 and hold the frame 90 in place. The frame 90 may comprise a second U-shaped portion 50 between the two locking bumps 20 and a temple portion 920 as shown in FIGS. 1 and 2.

The lens 910 with the locking groove 10 and the frame 90 with the two locking bumps 20 can be held together only with a force pressing down one against the other. The elastic force of the first U-shaped portion 40 of the frame 90 is essential.

The frame 90 may be connected to a temple portion 920 at a lower portion of the first U-shaped portion 40 of the frame 90 as shown in FIG. 3.

Each of the two locking bumps 20 may comprise an elastic surface. The two locking bumps 20 may be made of polymer.

In certain embodiments of the invention, the locking groove 10 may comprise a fluctuating shape against the edge of the lens 910. In such cases, the two locking bumps 20 may be omitted.

Figure 4:
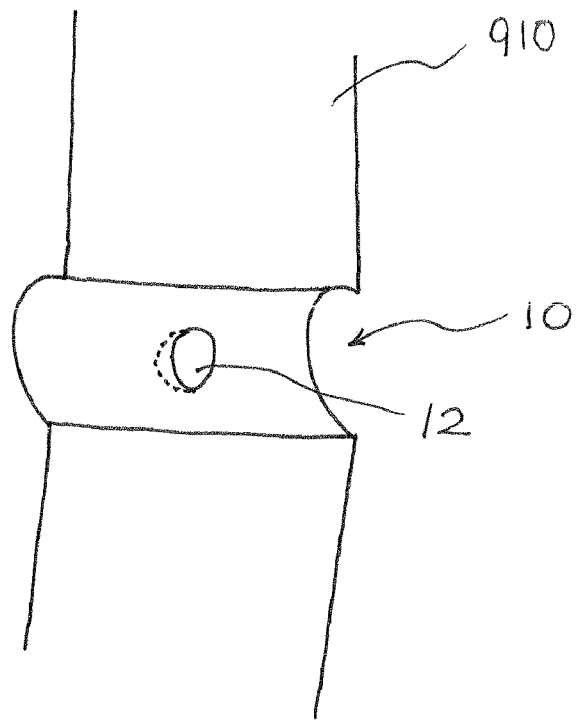
FIG. 4 is a perspective view of a locking groove with a locking dimple according to another embodiment of the invention.

Another aspect of the invention provides a frame locking device for eyeglasses comprising: a locking groove 10 provided on an outer edge of a lens, wherein the locking groove extends substantially perpendicularly to a surface of the lens; and a locking dimple 12 disposed in a middle portion of the locking groove 10, as shown in FIG. 4.

Figure 5:
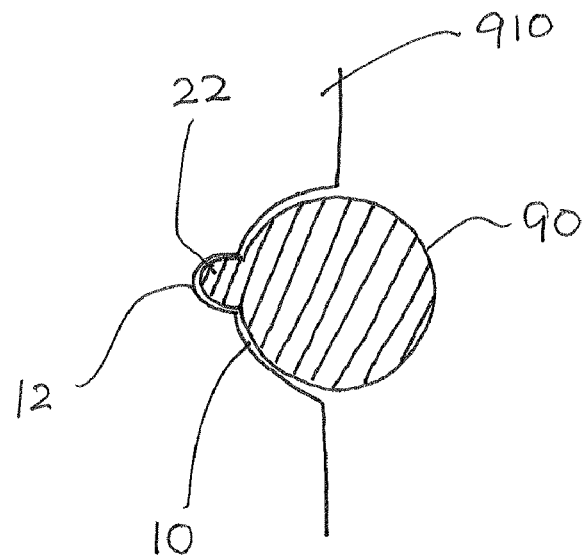
FIG. 5 is a cross-sectional view illustrating a bump assembled with the locking dimple of FIG. 4.

The frame comprises a side portion configured to be fitted into the locking groove 10 and a bump 22 configured to be fitted into the locking dimple 12, such that the frame 90 is locked in place by the locking groove 10 and the locking dimple 12 when pressed by keeping the frame 90 from moving upward, downward, forward, and backward, as shown in FIG. 5.

The frame may further comprise a fastening end configured to be fixed to a portion of the lens for the same reason as in the first embodiment. The fastening end may be provided through a hole disposed around the outer edge of the lens and fixed. The fastening end may be fixed to the hole with glue.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A frame locking device for eyeglasses comprising:
   a locking groove provided on an outer edge of a lens, wherein the locking groove extends substantially perpendicularly to a surface of the lens;
   a locking dimple disposed in a middle portion of the locking groove; and
   two locking bumps provided on a side portion of a frame, wherein the two locking bumps are apart from each other so as to lock the lens by fixing front and rear surfaces of the lens around the outer edge,
   wherein at least part of the side portion of the frame disposed between the two locking bumps is fitted into the locking groove of the lens such that the frame is locked in place at the locking groove when pressed,
   wherein a frame comprises the side portion configured to be fitted into the locking groove and a bump configured to be fitted into the locking dimple, such that the frame is locked in place by the locking groove and the locking dimple when pressed by keeping the frame from moving upward, downward, forward, and backward,
   wherein the frame further comprises a fastening end configured to be fixed to a portion of the lens,
   wherein the frame comprises a first U-shaped portion between the fastening end and the two locking bumps,
   wherein the first U-shaped portion of the frame has a predetermined magnitude of elasticity, so as to press the portion between the two locking bumps into the locking groove and hold the frame in place.

2. The frame locking device of claim 1, wherein less than half of the side portion of the frame disposed between the two locking bumps is fitted into the locking groove of the lens.

3. The frame locking device of claim 1, wherein more than half of the side portion of the frame disposed between the two locking bumps is detachably fitted into the locking groove of the lens.

4. The frame locking device of claim 2, wherein the side portion of the frame disposed between the two locking bumps comprises elastic parts so as to be pressed to be inserted into the locking groove and plucked out of the locking groove.

5. The frame locking device of claim 1, wherein the side portion of the frame disposed between the two locking bumps has a circular cross-section.

6. The frame locking device of claim 1, wherein the side portion of the frame disposed between the two locking bumps has a polygonal cross-section.

7. The frame locking device of claim 6, wherein the locking groove comprises a partially polygonal cross-sectional groove corresponding to the side portion of the frame.

8. The frame locking device of claim 1, wherein the fastening end is provided through a hole disposed around the outer edge of the lens and fixed.

9. The frame locking device of claim 8, wherein the fastening end is fixed to the hole with glue.

10. The frame locking device of claim 1, wherein the frame comprises a second U-shaped portion between the two locking bumps and a temple portion.

11. The frame locking device of claim 1, wherein the frame is connected to a temple portion at a lower portion of the first U-shaped portion of the frame.

12. The frame locking device of claim 1, wherein each of the two locking bumps comprises an elastic surface.

13. The frame locking device of claim 12, wherein the two locking bumps is made of polymer.

* * * * *